(12) United States Patent
Ozawa et al.

(10) Patent No.: US 10,205,385 B2
(45) Date of Patent: Feb. 12, 2019

(54) CIRCUIT AND METHOD OF A SWITCHING CONVERTER WITH ADAPTIVE PULSE INSERTION

(71) Applicant: Dialog Semiconductor (UK) Limited, London (GB)

(72) Inventors: Seiichi Ozawa, Saitama (JP); Santhos Ario Wibowo, Kanagawa (JP)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/150,472

(22) Filed: May 10, 2016

(65) Prior Publication Data

US 2017/0331365 A1    Nov. 16, 2017

(51) Int. Cl.
  *H02M 3/04* (2006.01)
  *H02M 1/08* (2006.01)
  *H02M 3/158* (2006.01)

(52) U.S. Cl.
  CPC .............. *H02M 3/04* (2013.01); *H02M 1/08* (2013.01); *H02M 3/1584* (2013.01)

(58) Field of Classification Search
  CPC ................................. H02M 3/04; H02M 1/08
  See application file for complete search history.

(56) References Cited

U.S. PATENT DOCUMENTS

| | | | |
|---|---|---|---|
| 6,366,070 B1 | 4/2002 | Cooke et al. | |
| 6,597,753 B1 * | 7/2003 | Okayasu | H03L 7/0995 375/373 |
| 6,724,602 B2 | 4/2004 | Giannopoulos | |
| 7,615,982 B1 | 11/2009 | Guo | |
| 8,058,859 B2 * | 11/2011 | Xu | H02M 3/156 323/284 |
| 8,159,805 B2 * | 4/2012 | Feng | H02M 3/156 361/111 |
| 8,330,437 B1 | 12/2012 | Hartman | |
| 8,766,617 B2 | 7/2014 | Wan et al. | |
| 8,994,350 B2 | 3/2015 | Li | |

(Continued)

OTHER PUBLICATIONS

German Office Action, File No. 10 2016 213 445.0, Applicant: Dialog Semiconductor (UK) Limited, dated Mar. 29, 2017, 10 pgs. and English language translation, 11 pgs.

*Primary Examiner* — Emily P Pham
(74) *Attorney, Agent, or Firm* — Saile Ackerman LLC; Stephen B. Ackerman

(57) ABSTRACT

A circuit and method for a switching converter that modifies the clock frequency when the panic comparator is activated is proposed. This solution for a switching converter is achieved by increases in the switching frequency in response to an undershoot condition. In summary, a switching converter circuit, comprising at least one phase functional block configured to provide an output voltage, a panic comparator configured to evaluate voltage excursion conditions of the output voltage, and a clock generator with pulse insertion function wherein the pulse insertion function is configured to increase the switching frequency during a voltage excursion condition to minimize or mitigate voltage excursions. In addition, a switching converter circuit, comprising a clock generator with a pulse width extender configured to provide a signal to said pulse insertion function logic.

17 Claims, 8 Drawing Sheets

(56) References Cited

U.S. PATENT DOCUMENTS

| | | | |
|---|---|---|---|
| 2005/0001597 A1* | 1/2005 | Walters | H02J 1/102 |
| | | | 323/222 |
| 2006/0261795 A1 | 11/2006 | Steele | |
| 2007/0013356 A1* | 1/2007 | Qiu | H02M 3/1584 |
| | | | 323/288 |
| 2007/0109825 A1* | 5/2007 | Qiu | H02M 3/156 |
| | | | 363/41 |
| 2008/0272752 A1* | 11/2008 | Qiu | H02M 3/1584 |
| | | | 323/272 |
| 2009/0072807 A1 | 3/2009 | Qiu et al. | |
| 2009/0121695 A1* | 5/2009 | Pierson | H02M 3/1584 |
| | | | 323/283 |
| 2009/0302817 A1 | 12/2009 | Nagai | |
| 2012/0039378 A1* | 2/2012 | Nakayama | H02M 3/337 |
| | | | 375/226 |
| 2012/0119720 A1 | 5/2012 | Li | |
| 2015/0326120 A1* | 11/2015 | Kelin | H02M 3/158 |
| | | | 323/282 |
| 2016/0004266 A1* | 1/2016 | Mercer | G05F 1/575 |
| | | | 323/280 |
| 2017/0060154 A1* | 3/2017 | Ozawa | G05F 1/575 |

* cited by examiner

CIRCUIT AND METHOD OF A SWITCHING CONVERTER WITH ADAPTIVE PULSE INSERTION

BACKGROUND

Field

The disclosure relates generally to a switching converter and, more particularly, to a circuit and method of a switching converter with an adaptive pulse insertion thereof.

Description of the Related Art

In electronic systems, some switching converters use multiple phases. Multi-phase switching converters are designed to provide maximum power efficiency. Phases can be enabled, or disabled, in a multi-phase switching converter. One of the characteristics of a switching converter that influences its efficiency is the load, and the response to transitions in the load. A technique to address higher load conditions is to enable the other phases in a multi-phase converter.

FIG. 1 shows a timing diagram of a multi-phase converter circuit with phase shedding function known to the inventor. FIG. 1 illustrates a timing response 100 of typical multi-phase switching converter. The figure illustrates the signals of an Output voltage for a maximum overshoot case 110, and a minimum case 115. FIG. 1 highlights a Panic comparator threshold in response to the output voltage cases. When the output voltage decreases below the Panic comparator threshold, the Panic comparator is enabled, illustrated as the Panic comparator output signal 120. FIG. 1 highlights Clock signals for the slave phase 130, Switching output for the Minimum case 140 and Maximum case 150, as well as the Slave phase current for the Maximum case 160, and Minimum case 170.

One of the solutions for addressing the load transitions is by introduction of a Panic comparator. As highlighted in FIG. 1, if the comparator detects the excess output voltage drop, it enables "slave" phases to compensate for any sudden voltage drop. A single or multiple slave phases can be enabled.

FIG. 1 illustrates the output voltage overshoot associated with the initiation of the Panic comparator. When the output voltage goes below the panic comparator threshold and the panic comparator trips, the slave phases are turned on asynchronously. It continues until the clock for the slave phase rises, and the pulse width modulation (PWM) control based on the voltage feedback starts. If the clock rises right after the Panic comparator trips, the first pulse is determined by PWM control. This transition is not of substantial width. This is the minimum case for the Panic comparator reaction. But if the clock rises just before the Panic comparator, the first pulse could be almost as wide as the clock period. The wider pulse can cause excessive high current. This is true especially in higher input voltage cases, and this induces large output voltage overshoot. By lowering the Panic comparator threshold voltage to avoid this over-shoot issue, then the Panic comparator response is less effective at heavy load transient conditions, leading to a larger undershoot.

U.S. Pat. No. 8,994,350 to Li describes a controller that controls switching of a power converter via a PWM control signal. The switching regulator detects load transients. Responsive to the detection load, the switching regulator resets the PWM clock synchronously with a faster clock, providing improved transient response.

U.S. Patent Application 2009/0012807 A1 to Qui et al. describes an adaptive pulse positioning system that provides the adjust signal to the adjust input of the ramp generator to adaptively shift the pulse signal in time in response to the output load transient without adding pulses to the pulse signal.

U.S. Pat. No. 6,724,602 to Giannopoulos shows a method and apparatus for fault condition protection with panic fault condition detection and panic fault condition removal. The method supplies a pulse train during normal operation, blocks the pulse train in overload conditions, and modifies if the overload condition persists.

U.S. Pat. No. 8,766,617 to Wan et al. titled shows a method for improving voltage identification transient response by sensing the inductor current of a voltage regulator.

In these prior art embodiments, the solution to improve a switching characteristics utilized various alternative solutions.

SUMMARY

It is desirable to provide a switching converter that minimizes and mitigates voltage overshoot.

A principal object of the present disclosure is to propose a switching converter that reduces the response to a dynamic load on the timing of the occurrence with respect to the phase of the switching frequency clock.

A principal object of the present disclosure is to propose a panic comparator that reduces variation of the panic comparator intensity with improved voltage regulation.

A principal object of the present disclosure is to propose a switching converter that increases the switching frequency in response to an undershoot condition.

A principal object of the present disclosure is to propose a switching converter that modifies the clock frequency when the panic comparator is activated.

In summary, a switching converter circuit, comprising at least one phase functional block configured to provide an output voltage, a panic comparator configured to evaluate voltage excursion conditions of the output voltage, and a clock generator with pulse insertion function wherein the pulse insertion function is configured to increase the switching frequency during a voltage excursion condition to minimize or mitigate voltage excursions.

In addition, A switching converter circuit, comprising at least one phase functional block configured to provide an output voltage, a panic comparator configured to evaluate voltage excursion conditions of said output voltage, and, a clock generator with pulse insertion function wherein said clock generator with pulse insertion function comprises of pulse insertion function logic, a clock divider circuit configured to provide a clock signal to said pulse insertion function logic, and a pulse width extender configured to provide a signal to said pulse insertion function logic.

A method of providing an improved switching in a multi-phase switching converter comprises the steps of a first step (a) providing a switch converter circuit comprising at least one phase, an error amplifier, output current monitor, a panic comparator, and a clock generator with pulse insertion, a second step (b) generating a clock pulse, a third step (c) switching the output voltage, a fourth step (d) detecting said output voltage, a fifth step (e) triggering said panic comparator during a voltage excursion, a sixth step (f) inserting said pulse in said clock generator with pulse insertion function.

Additionally, a method of providing an improved switching in a switching converter comprises the steps of a first step, (a) providing a switch converter circuit comprising at least one phase, an error amplifier, a panic comparator, and a clock generator with Pulse width extension, a second step (b) generating a clock pulse, a third step (c) switching the output voltage, a fourth step (d) detecting the output voltage, a fifth step (e) triggering said panic comparator during a voltage excursion; and, a last step (f) extending said pulse in said clock generator with Pulse width extension function.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 2:
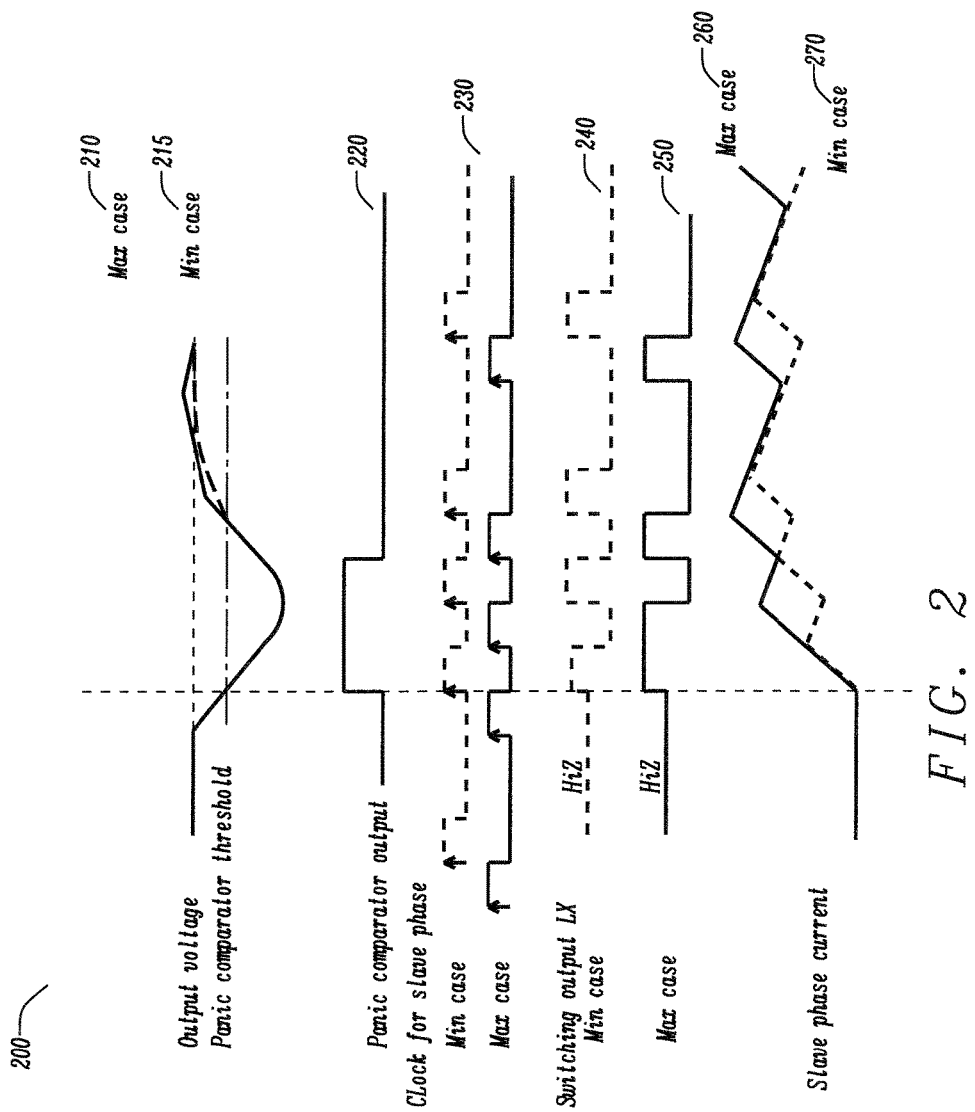
FIG. 2 is a timing diagram of switching converter in accordance with a first embodiment of the disclosure.

A switching converter that modifies the clock frequency when the panic comparator is activated is proposed. This solution for a switching converter is achieved by increases in the switching frequency in response to an undershoot condition. FIG. 2 is a timing diagram of a switching converter in accordance with a first embodiment of the disclosure. FIG. 2 illustrates a timing response 200 of a multi-phase switching converter of the disclosure. The figure illustrates the signals of an Output voltage for a maximum overshoot case 210, and a minimum case 215. FIG. 2 highlights a Panic comparator threshold in response to the output voltage cases. When the output voltage decreases below the Panic comparator threshold, the Panic comparator is enabled, illustrated as the Panic comparator output signal 220. FIG. 2 highlights Clock signals for the slave phase 230, Switching output for the Minimum case 240 and Maximum case 250, as well as the Slave phase current for the Maximum case 260, and Minimum case 270.

Figure 1:
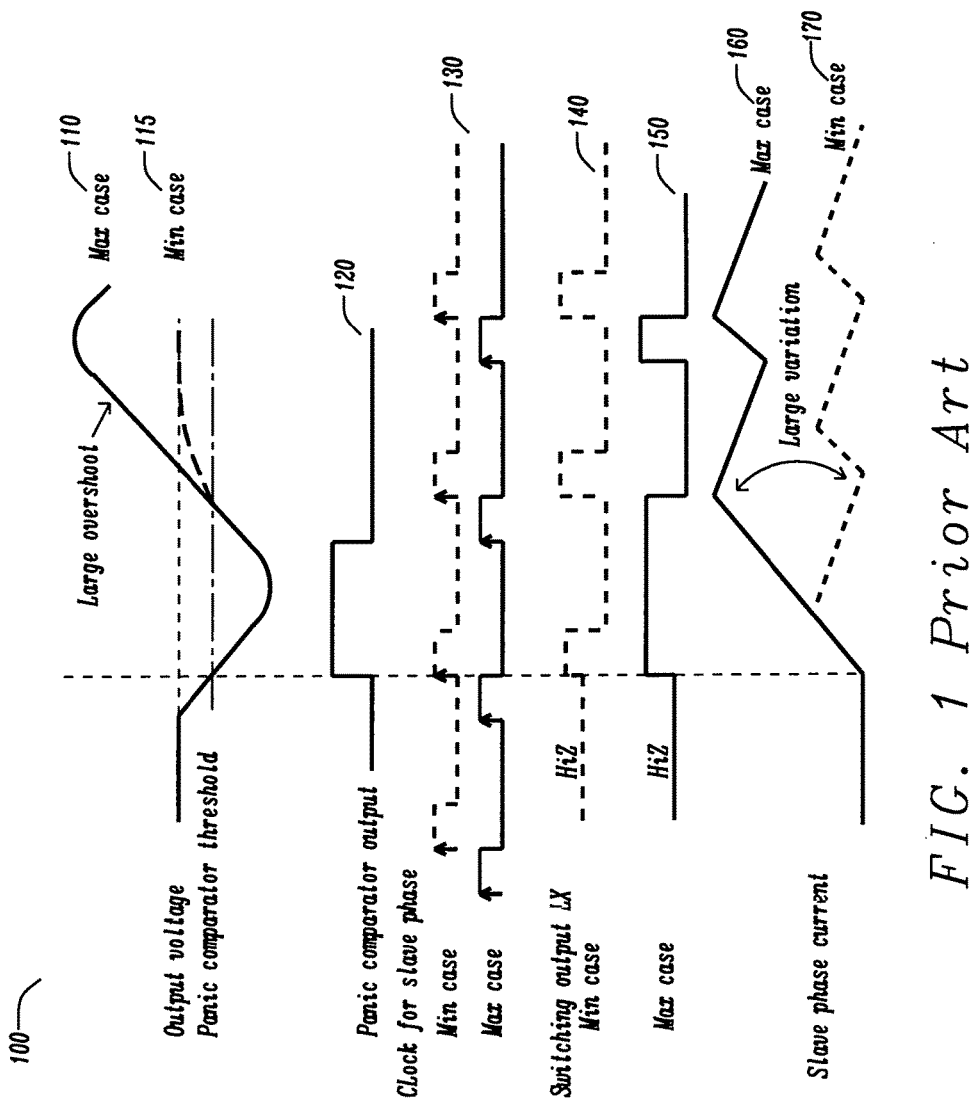
FIG. 1 is a timing diagram of a switching converter known to the inventor.

The first embodiment of the circuit, and the method associated with the timing diagram of FIG. 2 is addressed by modification of a clock generator. In FIG. 2, the Output voltage during Maximum case 210 is decreased significantly compared to the FIG. 1 Output voltage maximum 110. This is achieved by increasing the clock cycle while the Panic comparator 220 is activated. It can be observed that the clock cycle Clock for slave phase 230, as well as the switching output LX for Minimum case 240 and Maximum case 250 is increased during the time that the Panic comparator 220 is active. In addition, the variation between the Slave phase current for Maximum case 260 and Minimum case 270 is minimized.

As highlighted in FIG. 2, if the comparator detects the excess output voltage drop, it enables "slave" phases to compensate for any sudden voltage drop. A single or multiple slave phases can be enabled.

FIG. 2 illustrates the output voltage overshoot associated with the initiation of the Panic comparator. When the output voltage goes below the panic comparator threshold and the panic comparator trips, the slave phases are turned on asynchronously, it using an increased clock frequency as compared to FIG. 1.

Figure 3:
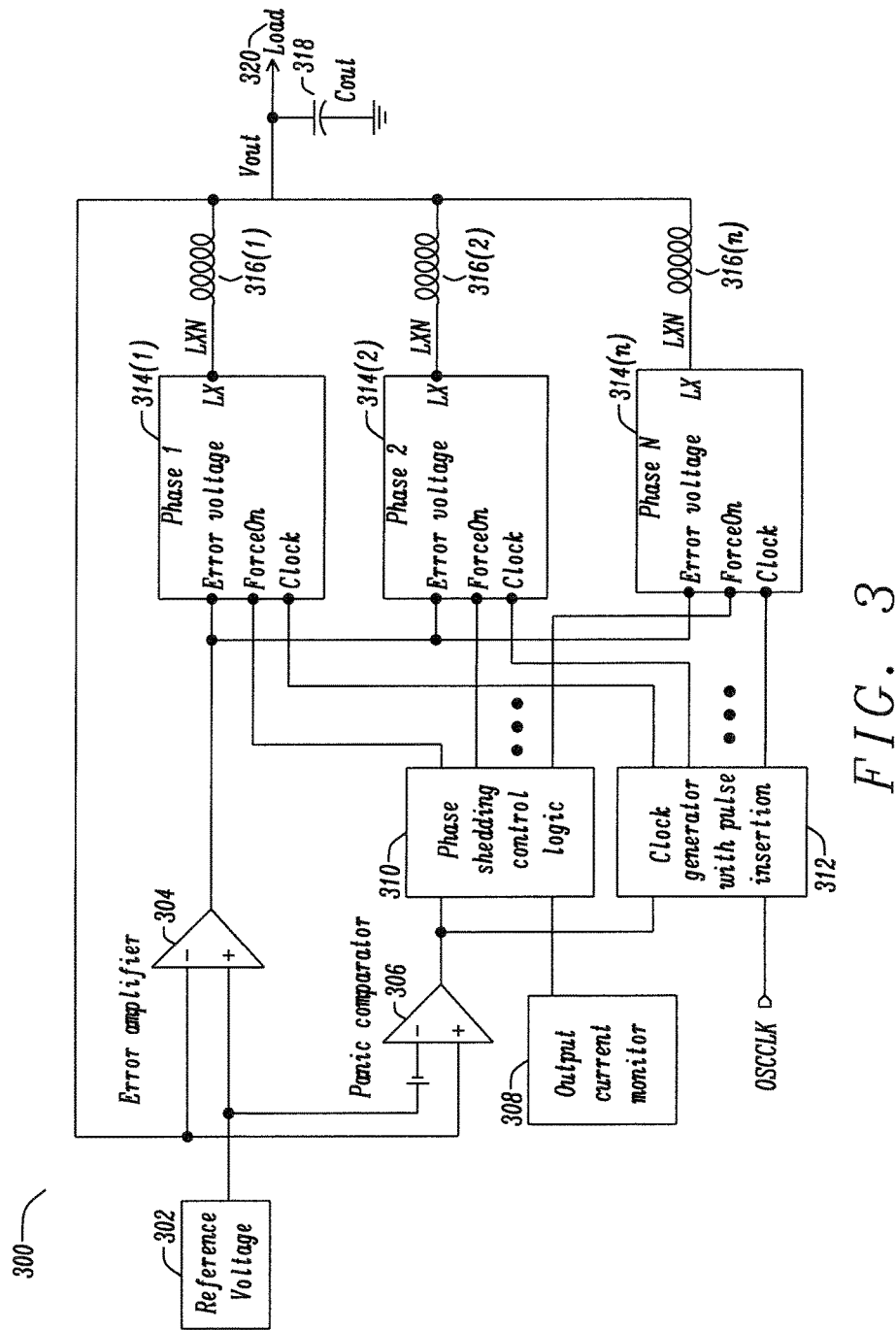
FIG. 3 is a circuit schematic of a multi-phase buck converter in accordance with a first embodiment of the disclosure.

FIG. 3 is a circuit schematic of a multi-phase buck converter in accordance with a first embodiment of the disclosure. The multi-phase buck converter 300 is shown with N phases. A reference voltage block 302 serves as an input signal to the Error amplifier 304, and panic comparator 306. The Panic comparator 306 has an input with output voltage Vout 305. The circuit further includes an Output current monitor 308. The output of the Panic comparator 306 is coupled to the inputs of a Phase shedding control logic block 310 and a Clock generator with pulse insertion 312. An input signal from the oscillator clock signal OSCCLK 313 serves as an input to the clock generator. The network is further followed by the Phase blocks 314 (1), 314 (2) to 314 (n) for the case of N blocks. Each phase block has three inputs: Error voltage, Force On, and Clock. The Error voltage input is coupled to the output of the Error amplifier 304. The Force On input is coupled to the output of the Phase shedding control block 310. The Clock input is provided from the output of the clock generator 312. The Phase blocks 314(1) to 314(n) are electrically coupled to inductors 316 (1) to 316 (n), respectively. The output of the inductor is coupled to the Error amplifier 304, Panic comparator 305, and the output node Vout 320. On the output node Vout 320 is an output capacitor Cout 318. The Clock generator 312 has a pulse insertion function. The pulse insertion function inserts an additional pulse, or pulses, into the clock generator to increase the frequency of pulses when the Panic comparator 312 is activated.

Figure 4:
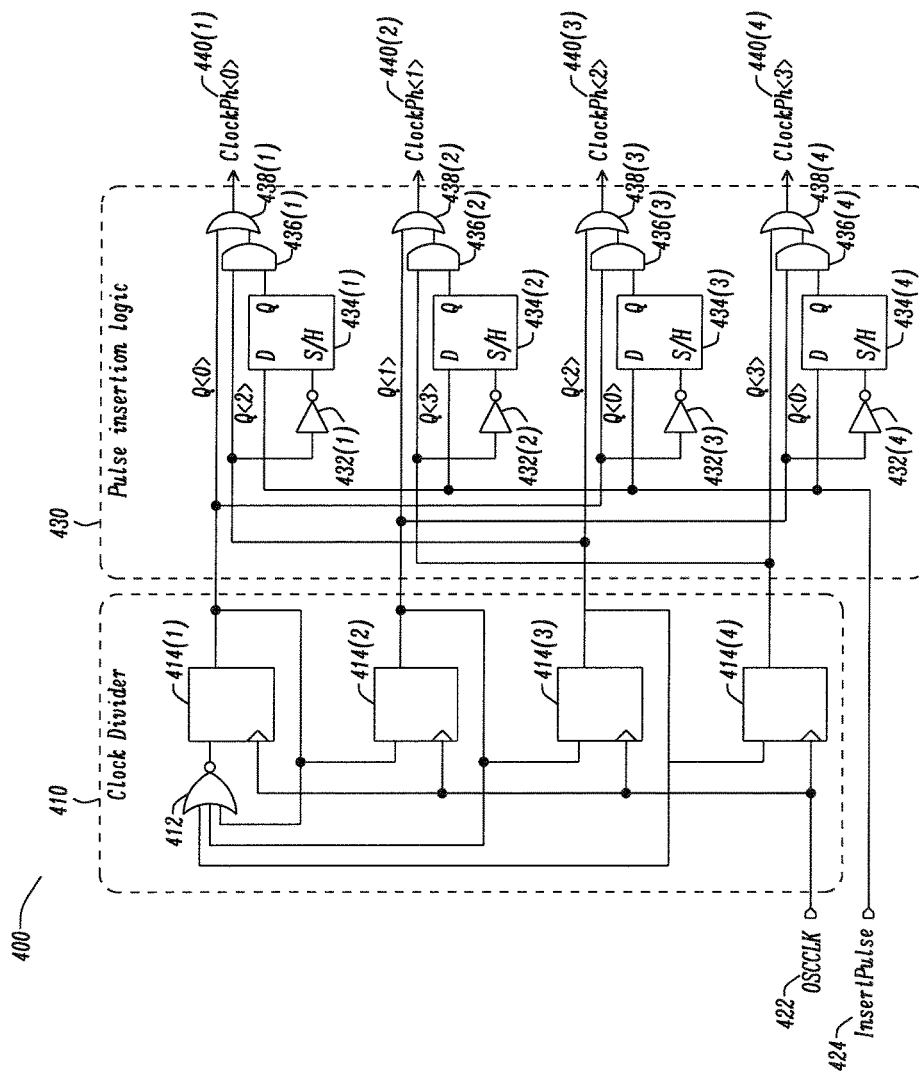
FIG. 4 is a circuit schematic of a clock generator circuit in accordance with a first embodiment of the disclosure.

FIG. 4 is a circuit schematic of a clock generator circuit in accordance with a first embodiment of the disclosure. The clock generator circuit 400 comprises a Clock Divider 410, and Pulse insertion logic block 430. The Clock Divider 410 comprises a 3-input NOR logic gate 412, and four clocked D flip-flop blocks 414 (1), 414 (2), 414(3), and 414(4). The pulse insertion logic 430 comprises of four parallel inverters 432(1) to 432(4), coupled to four DQ flip-flops 434(1), to 434(4), and AND logic gates 436(1) to 436(4), as well as OR logic gates 438(1) to 438(4). This network of Clock Divider 410 and Pulse insertion logic 430 provide four phase clock signals 440(1) to 440(4) at the output. The Clock Divider circuit network 410 has an input from the oscillator clock OSCCLK 422. The Pulse insertion logic 430 has an input from signal InsertPulse 424.

Figure 5:
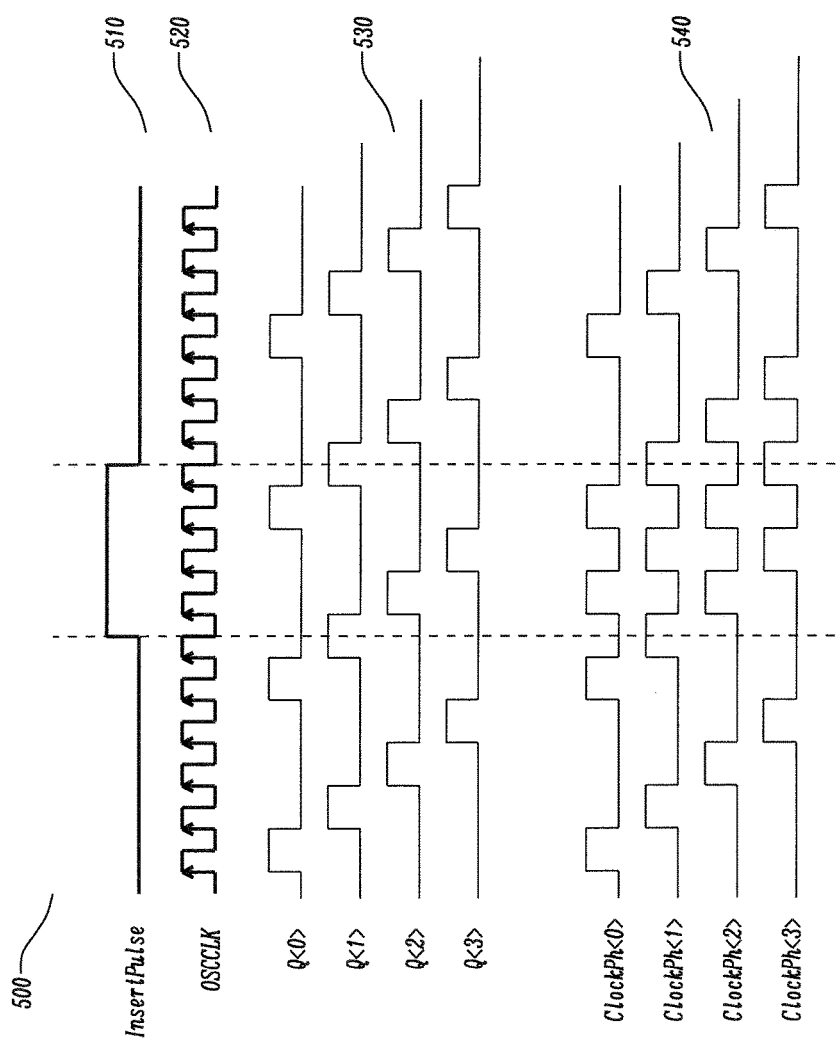
FIG. 5 is a timing diagram of a clock generator circuit in accordance with a first embodiment of the disclosure.

FIG. 5 is a timing diagram of a clock generator circuit 500 in accordance with a first embodiment of the disclosure. The signals shown in FIG. 5 consists of the InsertPulse signal 510, the oscillator clock signal 520, signals 530 Q<0>, Q<1>, Q<2>, and Q<3>, and the clock phase signals 540

ClockPh<0>, ClockPh<1>, ClockPh<2>, and ClockPh<3>. When the InsertPulse signal 500 is low, the four outputs of the Clock phase outputs 540(1) to 540(4) are the same as the clock frequency. When the InsertPulse signal 510 is high, additional pulses are added to the four outputs of the Clock phase outputs 540 for ClockPh<0>, ClockPh<1>, ClockPh<2>, and ClockPh<3>.

Figure 6:
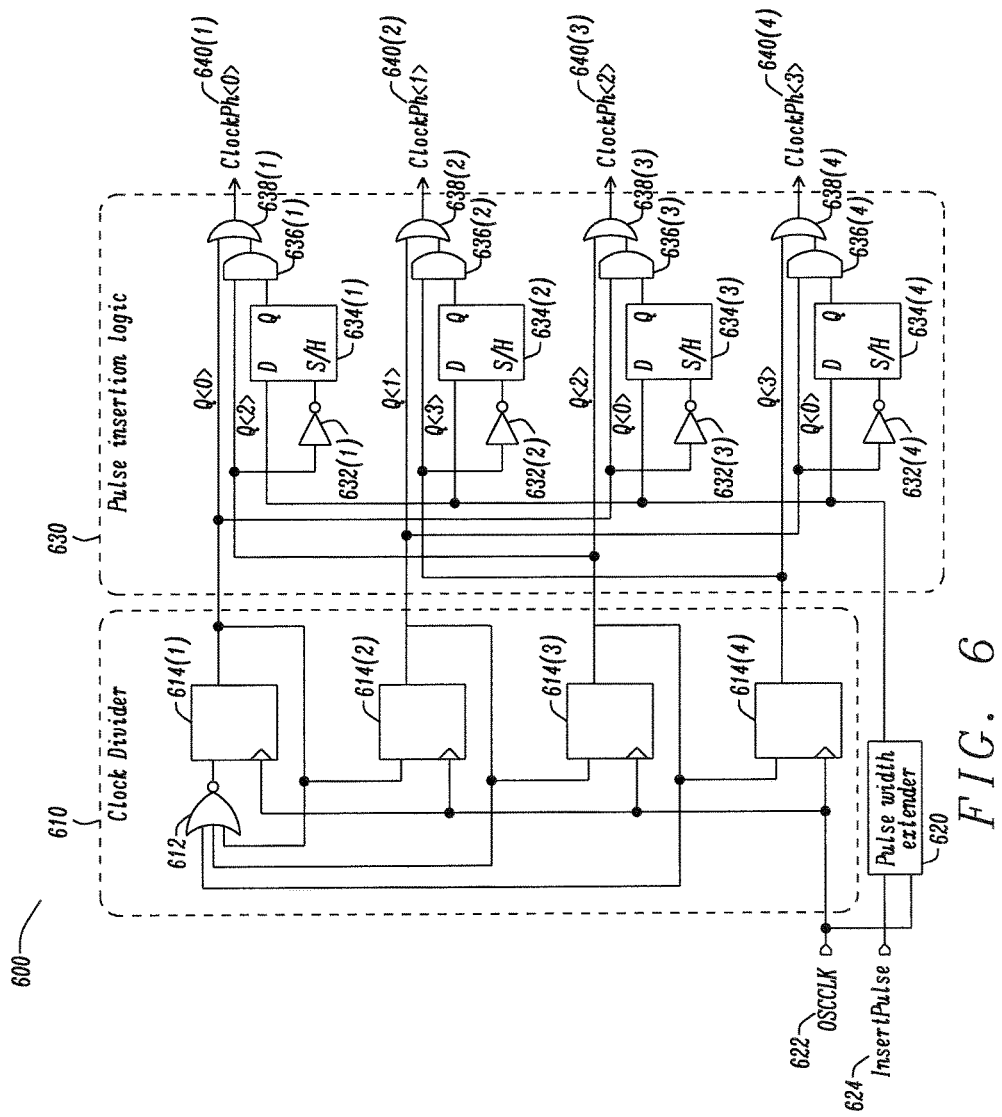
FIG. 6 is a circuit schematic of a clock generator in accordance with a second embodiment of the disclosure.

FIG. 6 is a circuit schematic of a clock generator in accordance with a second embodiment of the disclosure. FIG. 6 is a circuit schematic of a clock generator circuit in accordance with a second embodiment of the disclosure. The clock generator circuit 600 comprises a Clock Divider 610, and Pulse insertion logic block 630. The Clock Divider 610 comprises a 3-input NOR logic gate 612, and four D flip-flop blocks 614 (1), 614 (2), 614(3), and 614(4). The pulse insertion logic 630 comprises four parallel inverters 632(1) to 632(4), coupled to four DQ flip-flops 634(1), to 634(4), and AND logic gates 636(1) to 636(4), as well as OR logic gates 638(1) to 638(4). This network of Clock Divider 610 and Pulse insertion logic 630 provide four phase clock signals 640(1) to 640(4) at the output. The Clock Divider circuit network 610 has an input from the oscillator clock OSCCLK 622. The Pulse insertion logic 630 has an input from the Pulse width extender block 620. The Pulse width extender block 620 has an input signal InsertPulse 624. The Pulse width extender block 620 extends the width of the InsertPulse signal if it is too small to insert a pulse.

Figure 7:
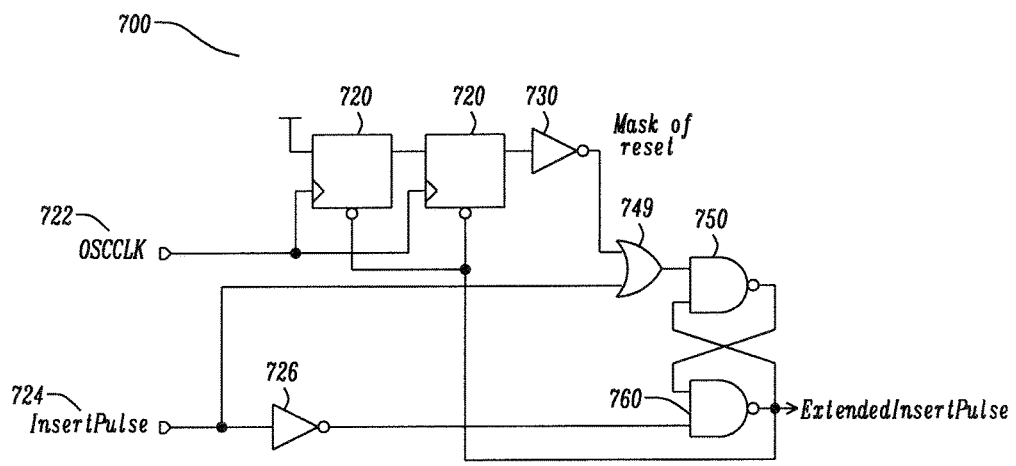
FIG. 7 is a circuit schematic of a pulse width extender circuit in accordance with a second embodiment of the disclosure.

FIG. 7 is a circuit schematic of a pulse width extender circuit in accordance with a second embodiment of the disclosure. As discussed in FIG. 6, the Pulse insertion logic has an input from the Pulse width extender block. The Pulse width extender block 700 has a series configured shift register D flip-flops 710 and 720, respectively. The output of the D flip-flop 720 is connected to the input of an inverter block 730. The inverter block 730 is connected to a OR logic gate 740. The input signals to the Pulse width extender are OSCCLK 722 and InsertPulse 724. The InsertPulse signal 724 is connected to inverter 726, and OR logic gate 740. The output signals of inverter 726 and OR logic gate 740 are inputs to an output switch 750 (with two NAND logic gates). The output flip-flop 750 provides the ExtendedInsertPulse signal 760. This output is also coupled to the shift register D flip-flops 710 and 720. The Pulse width extender block has an input signal InsertPulse 724. The function of this functional block 700 is to extend the input signal's pulse width if it is too narrow.

Figure 8:
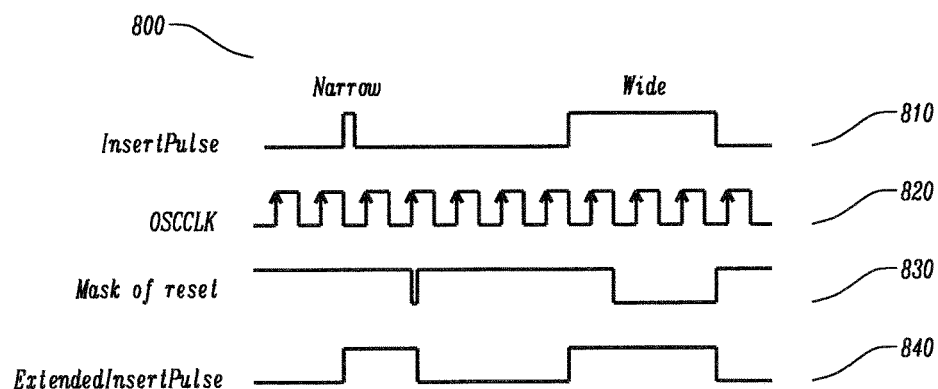
FIG. 8 is a timing diagram circuit schematic of a pulse width extender circuit in accordance with a second embodiment of the disclosure.

FIG. 8 is a timing diagram circuit schematic of a pulse width extender circuit in accordance with a second embodiment of the disclosure. Timing diagram 800 discusses the signals of InsertPulse 810, oscillator clock OSCCLK 820, Mask of Reset 830, and ExtendedInsertPulse 840. The input signals to the Pulse width extender are OSCCLK 820 and InsertPulse 810. The InsertPulse signal 810 is connected to inverters, and logic gates. The output signals of inverter and logic gate are inputs to a cross-coupled logic output switch. The cross-coupled logic output switch 750 provides the ExtendedInsertPulse signal 840. The Pulse width extender block has an input signal InsertPulse 810.

Figure 9:
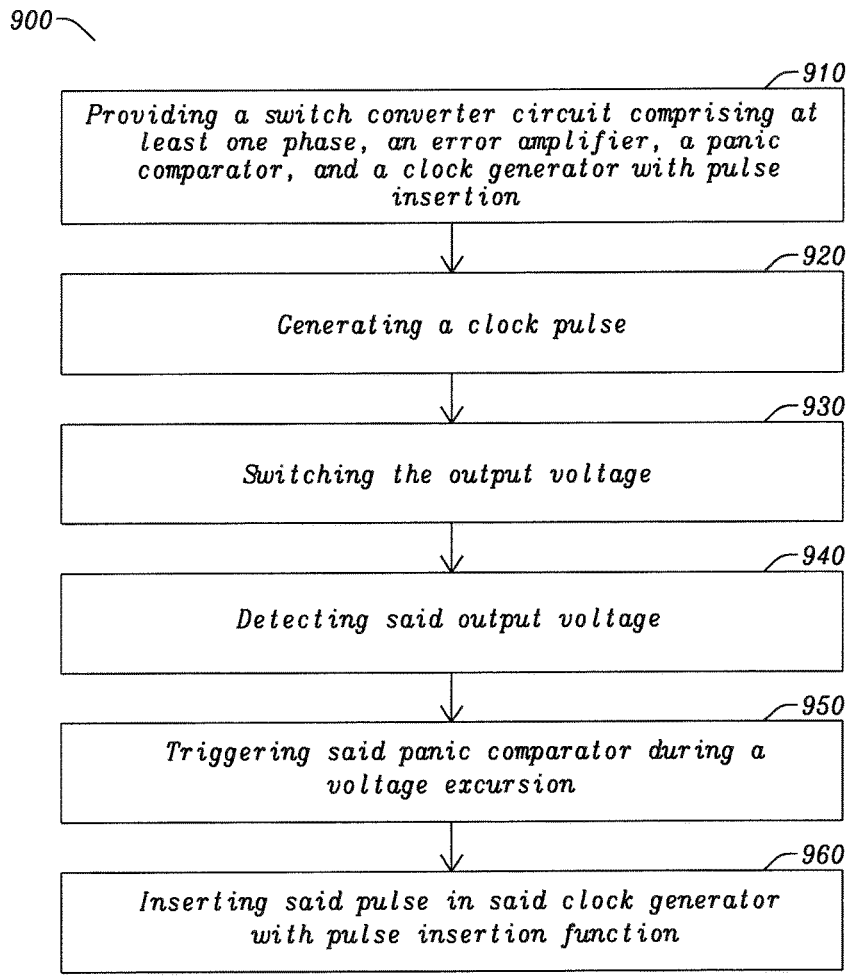
FIG. 9 is a method in accordance with a first embodiment of the disclosure.

FIG. 9 is a method in accordance with a first embodiment of the disclosure. A method 400 of providing an improved switching in a multi-phase switching converter comprises the steps of a first step 910 (a) providing a switch converter circuit comprising at least one phase, an error amplifier, output current monitor, a panic comparator, and a clock generator with pulse insertion, a second step 920 (b) generating a clock pulse, a third step 930 (c) switching the output voltage, a fourth step 940 (d) detecting said output voltage, a fifth step 950 (e) triggering said panic comparator during a voltage excursion, a sixth step 960 (f) inserting said pulse in said clock generator with pulse insertion function.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A switching converter circuit, comprising:
   at least one phase block configured to provide an output voltage;
   a clock divider circuit configured to receive an oscillator clock signal;
   a pulse insertion logic block configured to receive a clock signal from said clock divider circuit and configured to receive a signal to insert a pulse;
   a panic comparator configured to evaluate voltage excursion conditions of said output voltage; and
   a clock generator with said pulse insertion logic block wherein said pulse insertion logic block is configured to increase a switching frequency during one of said voltage excursion conditions to minimize or mitigate voltage excursions.

2. The switching converter circuit of claim 1 wherein said switching converter circuit is a multi-phase converter circuit.

3. The switching converter circuit of claim 2 wherein said switching converter circuit further comprises:
   a reference voltage;
   an error amplifier coupled to receive said reference voltage and said output voltage;
   said panic comparator configured to receive said reference voltage and said output voltage; and,
   a phase shedding control logic block configured to receive an output signal from said panic comparator.

4. The switching converter circuit of claim 3, further comprising: a feedback loop configured to provide a feedback signal from voltage output terminal to said error amplifier and said panic comparator.

5. A switching converter circuit, comprising:
   at least one phase block configured to provide an output voltage;
   a panic comparator configured to evaluate voltage excursion conditions of said output voltage;
   a clock generator with pulse insertion logic block comprising a pulse insertion logic block, a clock divider circuit configured to provide a clock signal to said pulse insertion logic block, and a pulse width extender circuit configured to provide the clock signal with an extended width to said pulse insertion logic block;
   a reference voltage;
   an error amplifier coupled to receive said reference voltage and said output voltage;
   a phase shedding control logic block configured to receive an output signal from said panic comparator; and
   a feedback loop configured to provide a feedback signal from a voltage output terminal to said error amplifier and said panic comparator.

6. The switching converter circuit of claim 5 wherein said pulse width extender circuit extends the clock signal width if it is too narrow.

7. The switching converter circuit of claim 5 wherein said pulse width extender circuit comprises:
   series configured shift register D flip-flops;
   an inverter block configured to receive a signal from said series configured shift register D flip-flops;
   an input clock signal;
   an insert pulse signal;
   a mask of reset circuit configured to receive the insert pulse signal and configured to receive a clock signal; and
   a flip-flop logic output configured to provide the insert pulse signal with the extended pulse width to the pulse insertion logic block.

8. The switching converter circuit of claim 7 wherein said mask of reset circuit comprises an OR logic gate.

9. The switching converter circuit of claim 7 wherein said flip-flop logic output comprises two cross-coupled NAND logic gates.

10. A method of providing improved switching in a switching converter circuit, comprising the steps of:
   (a) providing said switch converter circuit comprising at least one phase, an error amplifier, a panic comparator, a clock generator with a pulse insertion circuit and an output voltage;
   (b) generating a clock pulse;
   (c) triggering said panic comparator during a voltage excursion of said output voltage;
   (d) inserting one or more pulses in said clock generator with said pulse insertion circuit; and
   (e) providing a feedback signal from voltage output terminal to said error amplifier and said panic comparator.

11. The method of claim 10 wherein said switching converter circuit is a multi-phase converter.

12. The method of claim 11 wherein said multi-phase converter further comprises a plurality of phase logic blocks.

13. The method of claim 12 wherein said switching converter circuit further comprises a phase shedding control logic block.

14. A method of providing improved switching in a switching converter circuit, comprising following steps:
   (a) providing the switching converter circuit comprising at least more than one phase, an error amplifier, a panic comparator, a clock generator with a Pulse width extension circuit and an output voltage, a pulse insertion circuit and a feedback signal from a voltage output terminal to said error amplifier and said panic comparator;
   (b) generating a clock pulse;
   (c) triggering said panic comparator during a voltage excursion; and
   (d) extending a width of said clock pulse in said clock generator by said Pulse width extension circuit and provide the clock pulse to the pulse insertion circuit, wherein said pulse insertion logic block is configured to increase a switching frequency during one of said voltage excursion conditions to minimize or mitigate voltage excursions.

15. The method of claim 14 wherein said switch converter circuit is a multi-phase converter.

16. The method of claim 15 wherein said multi-phase converter further comprises a plurality of phase logic blocks.

17. The method of claim 16 wherein said switch converter circuit further comprises a phase shedding control logic block.

* * * * *